United States Patent [19]
Christ

[11] Patent Number: 6,082,077
[45] Date of Patent: Jul. 4, 2000

[54] TUBE FILLING MACHINE

[75] Inventor: Richard Christ, Emmelshausen, Germany

[73] Assignee: IWK Verpackungstechnik GmbH, Stutensee-Blankenloch, Germany

[21] Appl. No.: 09/060,370

[22] Filed: Apr. 15, 1998

[51] Int. Cl.[7] .................................................. P65B 35/00
[52] U.S. Cl. ............................................ 53/250; 198/408
[58] Field of Search .......................... 53/233, 244, 242, 53/250, 253, 284.7, 374.8, 375.6; 141/129, 141, 163, 171; 198/408, 413, 803.14, 803.15, 803.09

[56] References Cited

U.S. PATENT DOCUMENTS

| | | | |
|---|---|---|---|
| 1,828,864 | 10/1931 | Hopkins | 53/469 |
| 1,918,118 | 7/1933 | Marzochi | 53/276 |
| 3,367,472 | 2/1968 | Rossi | 198/377.03 |
| 3,677,273 | 7/1972 | Mahlstede et al. | 134/127 |
| 3,788,035 | 1/1974 | Geisel | 53/282 |
| 3,834,517 | 9/1974 | Reimers | 198/33 |
| 3,944,044 | 3/1976 | Hamy | 198/16 MS |
| 4,446,960 | 5/1984 | Zauner et al. | 198/408 |
| 4,614,073 | 9/1986 | Argazzi | 53/54 |
| 4,621,485 | 11/1986 | Argazzi | 53/564 |
| 5,291,984 | 3/1994 | Lusetti | 198/408 |

FOREIGN PATENT DOCUMENTS

| | | |
|---|---|---|
| 290879 | 11/1988 | European Pat. Off. . |
| 452845 | 11/1927 | Germany . |
| 550528 | 5/1932 | Germany . |
| 1577903 | 1/1970 | Germany . |
| 3516651 | 11/1985 | Germany . |
| 3525448 | 1/1986 | Germany . |
| 404367420 | 12/1992 | Japan . |
| 1735120 | 5/1992 | U.S.S.R. . |
| 1176279 | 1/1970 | United Kingdom . |

*Primary Examiner*—Joseph J. Haiel, III
*Assistant Examiner*—Dermott J. Cooke
*Attorney, Agent, or Firm*—Antonelli, Terry, Stout & Kraus, LLP

[57] ABSTRACT

A tube filling machine, including a conveying device rotating about a pair of axes defining a plane and having a plurality of holding elements in each of which a tube can be inserted. The tubes can be conveyed through individual works stations. In order to permit a simple modification and adaptation of the orientation of the tubes during their passage through the tube filling machine, the plane defined by the axes is inclined at an angle $\alpha$ to the horizontal, and each tube is so held in its holding element that its longitudinal axis is inclined at an angle $\beta$ relative to the defined plane. The angle $\alpha$ and the angle $\beta$ are preferably in the range 20 to 70°.

10 Claims, 2 Drawing Sheets

TUBE FILLING MACHINE

FIELD OF THE INVENTION

The invention relates to a tube filling machine having a transporting device rotating in one plane and provided with a plurality of holding elements, on each of which is insertable at least one tube and of each which is conveyable through individual work stations.

BACKGROUND OF THE INVENTION

Tube filling machines having the aforementioned construction are used for continuously guiding a supply of empty tubes to the machine through the work stations necessary for filling and sealing the tubes and for subsequently delivering the filled, sealed tubes to a further processing, e.g. packaging, means. For the transporting or conveying of the tubes within the tube filling station, use is made of a rotating conveying or transporting device in the form of a circular traveller, which has a turntable, or an oval traveller, which comprises a belt guided by means of at least two return pulleys, e.g. in the form of a toothed belt or chain. As the filling and sealing processes can only be performed on vertically upright tubes, the known conveying devices are mainly constructed in a horizontally rotating manner, and throughout the conveying operation through the tube filling machine the tubes are held in a vertical orientation. However, this leads to considerable disadvantages at the supply station, where the empty tubes are inserted in the conveying device, because the empty tubes are taken from a magazine, where they are generally received in a horizontally lying form. Thus, the supply station contains a righting device for the tubes, by means of which each tube must be drawn up from the horizontal orientation into the vertical orientation before it can be inserted in the conveying device.

In the removal station located at the end of the rotating conveying movement and where the filled tubes are removed from the tube filling machine and passed on in a lying, horizontal orientation, it is once again necessary to bring the tubes from the vertical orientation into the horizontal orientation. This double modification to the tube orientation is complicated from the equipment standpoint, and therefore is expensive, particularly in the case of multipath tube filling machines, where several tubes must be simultaneously supplied. This also gives rise to a potential fault source during the operation of the tube filling machine. This is, inter alia, linked with the fact that, generally, swivelling V-blocks are used, which hold the tubes with vacuum and which react sensitively to non-circular tubes. During tube discharge, deflection usually takes place in free fall, with subsequent sliding off of a transfer plate. Fault susceptibility can be increased by friction fluctuations due to contamination or dirtying.

The problem object of the invention is to provide a tube filling machine avoiding the aforementioned disadvantages and enabling the orientation of the tubes to be adapted in a simple manner.

SUMMARY OF THE INVENTION

In the case of a tube filling machine of the aforementioned type, the invention solves this problem in that the plane of the conveying device is inclined at an angle $\alpha$ with respect to the horizontal, and in that the tube is so held in the holding element that its longitudinal axis is inclined at an angle $\beta$ with respect to the plane of the conveying device.

In the case of the tube filling machine according to the invention, the change to the tube orientation relative to the horizontal is brought about solely in that the plane of the conveying device is inclined at the angle $\alpha$ relative to the horizontal, and in that $0°<\alpha<90°$. Preferably the angle $\alpha$ is within the range 20 to 70°. The tube is vertically oriented in the filling and sealing station. A vertical orientation of the tube in the filling and sealing stations is brought about if the holding element is inclined at the angle $\beta$ relative to the plane of the conveying device, and if $\alpha+\beta=90°$. The angle $\beta$ should also be in the range 20 to 70°. In the facing portion of the rotating conveying device, which is preferably constructed as a rotating toothed belt or corresponding chain, the longitudinal axis of the tube is then inclined at the angle $\alpha-\beta+180°$ relative to the horizontal or at the angle $\alpha-\beta+90°$ relative to the vertical.

If the angles $\alpha$ and $\beta$ are both chosen at 45°, the tube on one side of the rotating toothed belt is held in a vertical orientation and on the other side of the toothed belt in a position pivoted by 90° thereto, i.e. in the horizontal orientation. Thus, the empty tubes can be introduced in a horizontal orientation into the holding elements of the conveying, and as a result of the rotation through the tube filling machine due to said inclination the empty tubes are brought into a vertical orientation in which they can be filled and sealed, and then during the further rotation the tubes return to their horizontal orientation, so that they can easily be removed and taken away.

If the angle $\alpha$ is somewhat smaller than 45° and the angle $\beta$ somewhat larger than 45° and if $\alpha+\beta=90°$, the tubes on one side of the rotating toothed belt (filling and sealing side) continue to be in a vertical orientation, whereas on the opposite side of the toothed belt they can extend at a small angle relative to the horizontal. This can be advantageous for facilitating tube feeding from a slightly inclined tube magazine.

The conveying device or toothed belt can be driven by means of a known servomotor or stepping, or a mechanical gear.

According to a preferred embodiment of the invention, the holding elements are fitted externally to the toothed belt and have holding tongues which project an inclined manner from the toothed belt at an angle of $\gamma=\alpha+90°$. Each holding tongue can receive at least one tube, and preferably to each holding tongue is fitted at least one tube holder which, if necessary, can be replaced, and consequently permits in simple manner an adaptation of the tube filling machine to a different tube format.

BRIEF DESCRIPTION OF THE DRAWINGS

Further details and features of the invention can be gathered from the following description of an embodiment with reference to the attached drawings, wherein.

DETAILED DESCRIPTION OF THE INVENTION

Figure 1:
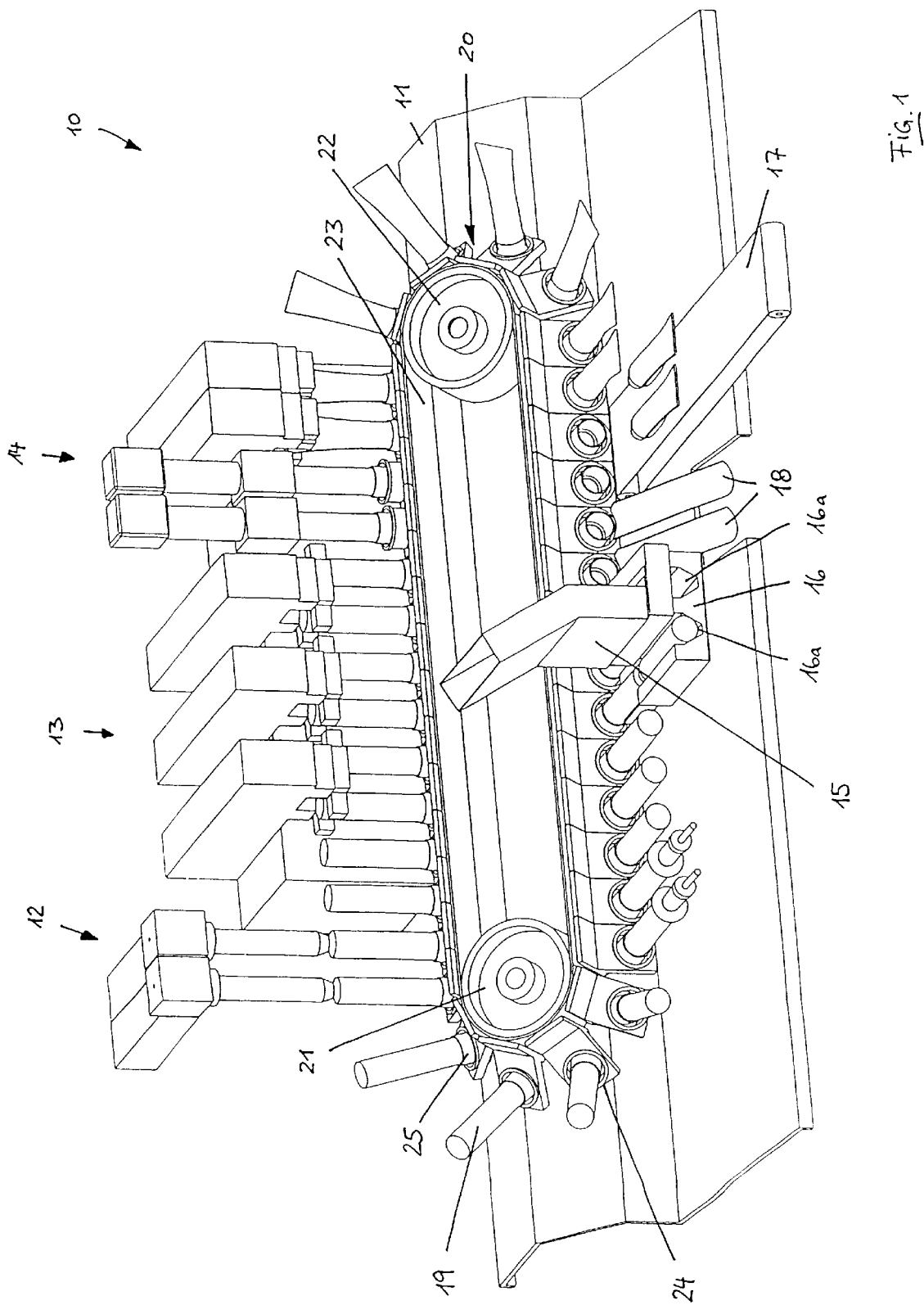
FIG. 1 is a perspective, detail view of a tube filling machine.

A tube filling machine 10 shown in FIG. 1 has a bearing support 11, on which is rotatably mounted an endless conveying device 20, including two pulleys 21, 22. Around the pulleys 21 and 22 passes a toothed belt 23 carrying on its outside a plurality of holding elements 24, or each of which can be inserted a tube 19.

Figure 2:
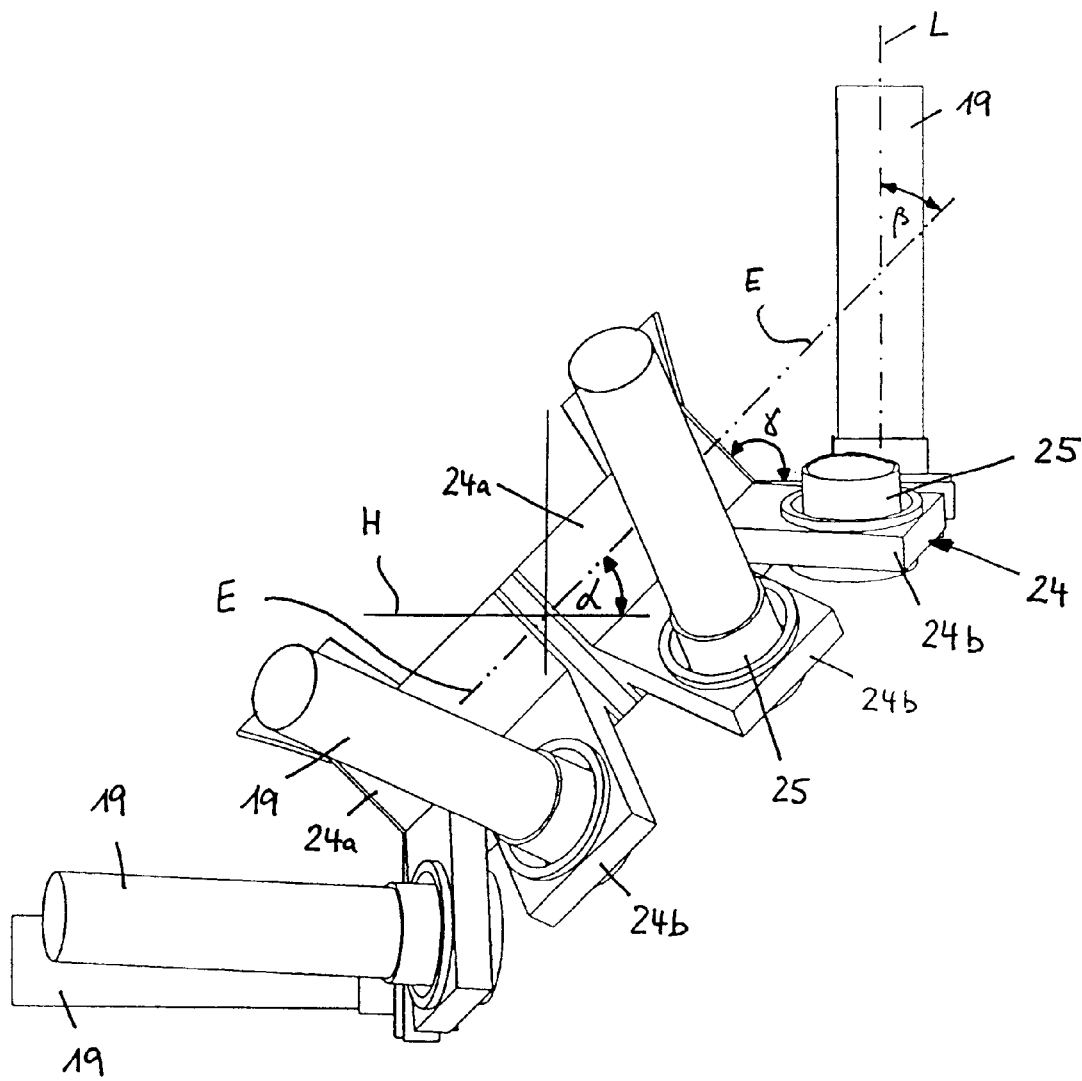
FIG. 2 is a larger scale side view of the conveying device.

As shown in FIG. 2, the toothed belt 23 lies at a plane E, which is inclined at an angle $\alpha$ relative to the horizontal H.

Each holding element 24 is fitted by a fastening portion 24a to the outside of the toothed belt 23 and includes a holding tongue 24b, angled for this purpose at an angle γ=α+90°, and which carries a tube holder 25. In each tube holder 25 is insertable a tube 19 in such a way that its longitudinal axis L extends in an inclined manner at an angle β with respect to the plane E of the toothed belt 23. In each case the angles α and β are 45°, so that the tubes 19 on the upper strand side of the toothed belt 23 (to the right in FIG. 2) are substantially vertically oriented, whereas on the lower stand side (to the left in FIG. 2) they have an orientation pivoted by the angle α−β+90°=90° thereto, i.e. a horizontal orientation.

According to FIG. 1, in the lower strand area of the toothed belt 23 is provided a feed block 16 with two tube receptacles 16a, to each of which can be supplied in horizontal orientation by means of a supply shaft 15 an empty tube. The tubes in the tube receptacle 16a of the feed block 16 are inserted in a manner not shown into the horizontally oriented tube holder 25 of the holding elements wherein alpha plus beta equals ninety degrees perform a rotation or cycle through the tube filling machine 10 while in the tube holders. As a result of the deflection or rerouting of the toothed belt 23 at the return pulley 21, and as a result of the inclined position of the toothed belt 23, the tubes are vertically oriented on the upper strand side of the belt. In this orientation they pass through a filling station 12 and a number of sealing stations 13 and 14, before, as a result of the deflection or rerouting of the toothed belt 23 at the return pulley 22, they again pass to the lower strand side and assume a horizontal orientation. Shortly before reaching the feed block 16, the correctly filled tubes are removed by means of a discharge belt 17, and the possibly faulty tubes are supplied by means of a chute 18 to a storage bin.

As can in particular be gathered from FIG. 2, solely through the inclination of the plane E of the toothed belt 23 in conjunction with the inclination of the holding tongue 24b or the longitudinal axis L of the tube, it is possible to bring about a change in the orientation of the tube during its passage through the tube filling machine.

What is claimed is:

1. A tube filling machine comprising an endless conveying device mounted for rotation about a single pair of axes defining a single plane; and a plurality of holding elements connected to said endless conveying device for insertion thereon of a plurality of tubes, to convey the tubes through individual work stations, wherein:

the defined plane is inclined at an angle α relative to the horizontal;

said holding elements hold the tubes with the longitudinal axis of each tube inclined at an angle β relative to the defined plane; and each of the angles α and β is in the range of from 20° to 70°.

2. A tube filling machine according to claim 1, wherein the angle α is the same as the angle β.

3. A tube filling machine according to claim 1, wherein the angles α and β differ.

4. A tube filling machine according to claim 1, wherein said conveying device comprises a rotating belt or chain.

5. A tube filling machine according to claim 2, wherein each of said holding elements is fitted externally to said belt or chain and includes a holding tongue projecting in an inclined manner from said belt or chain at an angle γ=α+90°.

6. A tube filling machine according to claim 3, wherein each of said holding elements further includes a tube holder replaceably fixed to said holding tongue.

7. A tube filling machine according to claim 4, wherein each of said holding elements further includes a plurality of tube holders replaceably fixed to said holding tongue.

8. A tube filling machine comprising:

an endless conveying device including a drive roller, a driven roller, and an endless conveyor surface, said endless conveyor surface being looped around said drive roller and said driven roller to provide an upper run terminating in a first 90° turn to a lower run that extends parallel and coextensive with said upper run and terminates in a second 90° turn to said upper run; and a plurality of holding elements connected to said endless conveyor surface for insertion thereon of a plurality of tubes, to convey the tubes through individual work stations, wherein:

each of said upper run and said lower run is inclined at an angle α with respect to the horizontal, said holding elements are inclined at an angle β with respect to said upper run and said lower run to hold the tubes with the longitudinal axis of each tube extending substantially vertically when the tube is conveyed on said upper run and extending substantially horizontally when the tube is conveyed on said lower run.

9. A tube filling machine as claimed in claim 6, wherein each of the angles α and β is in the range of from 20° to 70°.

10. A tube filling machine as claimed in claim 6, wherein α+β=90°.

* * * * *